(12) United States Patent
Kim (10) Patent No.: US 9,661,213 B2
(45) Date of Patent: May 23, 2017

(54) CAMERA MODULE (71) Applicant: LG Innotek Co., Ltd., Seoul (KR)

(72) Inventor: Dong Hyun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/908,818

(22) PCT Filed: Jul. 29, 2014

(86) PCT No.: PCT/KR2014/006947
§ 371 (c)(1),
(2) Date: Jan. 29, 2016

(87) PCT Pub. No.: WO2015/016586
PCT Pub. Date: Feb. 5, 2015

(65) Prior Publication Data
US 2016/0165125 A1 Jun. 9, 2016

(30) Foreign Application Priority Data

Jul. 29, 2013 (KR) .................. 10-2013-0089330
Sep. 6, 2013 (KR) .................. 10-2013-0107022

(51) Int. Cl.
H04N 5/225 (2006.01)
H04N 5/232 (2006.01)
(Continued)

(52) U.S. Cl.
CPC .......... *H04N 5/23212* (2013.01); *G02B 7/04* (2013.01); *G03B 3/10* (2013.01); *G03B 13/36* (2013.01);
(Continued)

(58) Field of Classification Search
CPC .... H04N 5/2251; H04N 5/22547; G02B 7/02; G02B 7/023; G02B 13/001
(Continued)

(56) References Cited

U.S. PATENT DOCUMENTS

2007/0263115 A1* 11/2007 Horidan ............... H04N 5/2254
348/340
2008/0130144 A1 6/2008 Chang
(Continued)

FOREIGN PATENT DOCUMENTS

EP          1150152 A1    10/2001
KR    1020100125978 A    12/2010
(Continued)

OTHER PUBLICATIONS

International Search Report in International Application No. PCT/KR2014/006947, filed Jul. 29, 2014.
(Continued)

*Primary Examiner* — Kelly L Jerabek
(74) *Attorney, Agent, or Firm* — Saliwanchik, Lloyd & Eisenschenk (57) ABSTRACT

A camera module is disclosed. One embodiment of the present invention comprises: a printed circuit board provided with an image sensor; a lens unit mounted at the upper side of the printed circuit board and arranged at a position corresponding with the image sensor; and an actuator unit for fixing the lens unit and adjusting the focus of an image, wherein a lens barrel has a groove formed on the outer peripheral surface thereof.

20 Claims, 7 Drawing Sheets (51) Int. Cl.
*G03B 3/10* (2006.01)
*G03B 17/18* (2006.01)
*G03B 13/36* (2006.01)
*G02B 7/04* (2006.01)
*G03B 13/00* (2006.01)

(52) U.S. Cl.
CPC ........... *G03B 17/18* (2013.01); *H04N 5/2253* (2013.01); *H04N 5/2254* (2013.01); *H04N 5/2257* (2013.01); *G03B 2205/0069* (2013.01)

(58) Field of Classification Search
USPC .................................. 348/340, 345–352, 357
See application file for complete search history.

(56) References Cited

U.S. PATENT DOCUMENTS

| | | | | |
|---|---|---|---|---|
| 2008/0192124 A1* | 8/2008 | Nagasaki | ................. | G02B 7/02 348/208.11 |
| 2008/0198254 A1* | 8/2008 | Nagasaki | ................. | G02B 7/08 348/335 |
| 2010/0110270 A1* | 5/2010 | Sekimoto | ............. | H04N 5/2254 348/340 |
| 2011/0116180 A1 | 5/2011 | Lim | | |
| 2011/0141338 A1 | 6/2011 | Lee et al. | | |
| 2011/0159919 A1* | 6/2011 | Kim | ......................... | G02B 7/08 455/556.1 |
| 2011/0236008 A1* | 9/2011 | Kang | ...................... | G03B 3/10 396/133 |
| 2013/0120648 A1* | 5/2013 | Oh | ....................... | H04N 5/2252 348/374 |
| 2013/0128108 A1* | 5/2013 | Oh | ....................... | H04N 5/2253 348/374 |

FOREIGN PATENT DOCUMENTS

| | | |
|---|---|---|
| KR | 1020100129930 A | 12/2010 |
| KR | 20110034258 A | 4/2011 |
| KR | 20120042517 A | 5/2012 |
| KR | 1020120041323 A | 5/2012 |
| KR | 1020130008769 A | 1/2013 |
| WO | WO-2011078614 A2 | 6/2011 |

OTHER PUBLICATIONS

Office Action dated Jan. 18, 2017 in European Application No. 14832587.1.

* cited by examiner

CAMERA MODULE

CROSS-REFERENCE TO RELATED APPLICATIONS

This application is the U.S. national stage application of International Patent Application No. PCT/KR2014/006947, filed Jul. 29, 2014, which claims priority to Korean Application Nos. 10-2013-0107022, filed Sep. 6, 2013, and 10-2013-0089330, filed Jul. 29, 2013, the disclosures of each of which are incorporated herein by reference in their entirety.

TECHNICAL FIELD

The teachings in accordance with the exemplary embodiments of this present invention generally relate to a camera module.

BACKGROUND

Concomitant with generalization of propagation of various mobile phones and commercialization of wireless internet services, consumer demands related to mobile phones are also diversified, whereby various types of peripheral devices are mounted on a mobile phone. A camera module is one of various peripheral devices configured to photograph an object in a photo or a video format, to store same in an image data and edit/transmit as occasion arises.

Recently, demands on a small-sized compact camera module are on the increase for use in various multimedia fields including notebook type personal computers, camera phones, PDAs (Personal Digital Assistants), smart phones and toys, and in image input equipment including monitoring cameras and information terminals for video tape recorders.

As the pixel size of sensors applied to the camera module is miniaturized, and height of the camera module becomes lower, development of mounting structure for securing a mechanical reliability of a camera module including control to introduction of foreign objects, and tilt or shift of lens optical axis has emerged as one of the important topics. A camera module manufactured by coupling of a lens barrel and a bobbin by screw threads can generate foreign objects due to friction between male screw thread and a female thread during focus adjustment operation, whereby an image quality deteriorates due to the generated foreign objects, which leads to development of a screw thread-free camera module.

Meantime, epoxy penetrated into a lens barrel and a bobbin may continuously move downwards to be transferred to an image area, resulting in generation of defected camera module in the course of using epoxy for assembly of a lens barrel during a manufacturing process of a camera module with a screw-free type lens barrel.

The camera module according to prior art includes a cover can accommodated by a lens unit and an actuator and a PCB (Printed Circuit Board) mounted at a bottom surface of the cover can. The actuator is formed with a terminal unit in order to apply an electric power to a coil unit forming the actuator, and a soldering unit formed while the terminal unit and the PCB are soldered may generate a short-circuit due to contacts with other electric elements within a metal-materialed cover can or a mobile phone mounted with a camera module. Hence, the conventional camera module blocks itself from outside metal and electrical elements by attaching an insulating tape to a terminal unit.

Meantime, although the cover can functions to protect inner elements from outside shocks as mentioned above, the cover can must also function to protect elements of camera module from outside electromagnetic interference generated by a mobile phone, and therefore, the cover can is preferred to be manufactured with a metal material.

The metal-materialed cover can is electrically connected to a bottom side surface of the PCB using a conductive tape and grounded. Under these circumstances, the conventional camera module must be assembled by a conductive tape and an insulating tape respectively, which makes a manufacturing process complicated and is not preferable in terms of product manufacturing aspect.

Furthermore, although the conventional camera module requires assembly using the conductive tape and the insulating tape respectively, the camera module is a relatively small-sized product and restricted in space for attaching the conductive tape and the insulating tape respectively.

DETAILED DESCRIPTION OF INVENTION

Technical Subjects

The technical subject of the present invention is to improve reliability of a camera module including a screw thread-freely-coupled lens barrel. Another technical subject of the present invention is to provide a camera module improved in productivity and reliability by removing generation of electrical interference that may have an influence on an OIS (Optical Image Stabilization) type camera module.

Technical Solutions

In one general aspect of the invention, there is provided a camera module, the camera module comprising:

a PCB (Printed Circuit Board) mounted with an image sensor;

a lens unit installed at an upper side of the PCB, and disposed at a position corresponding to that of the image sensor; and an actuator unit fixing the lens unit and adjusting a focus of an image, wherein a groove is formed at a peripheral surface of the lens unit.

Preferably, but not necessarily, the lens unit may further include at an upper side a flange unit so formed as to protrude to outside.

Preferably, but not necessarily, the groove may be formed at a bottom side of the flange unit.

Preferably, but not necessarily, the actuator unit may include a bobbin coupled to a peripheral surface of the lens unit to fix the lens unit, a coil unit formed at a peripheral surface of the bobbin, a magnet unit formed at a position corresponding to that of the coil unit, and a yoke unit configured to fix the magnet unit.

Preferably, but not necessarily, the bobbin may include an upper end unit configured to form an upper end of the bobbin and to have a minor diameter same as or greater than an outer diameter of the flange unit, a taper unit formed by being extended from a bottom side of the upper end unit and formed by being slanted to an optical axis direction, and a bottom end unit formed by being extended from a bottom side of the taper unit and having a minor diameter same as or greater than an outer diameter of the lens unit.

Preferably, but not necessarily, the groove may be formed at a peripheral surface of the lens unit positioned at a bottom end unit of the bobbin.

Preferably, but not necessarily, the groove may be formed at a peripheral surface of the lens unit positioned at the taper unit of the bobbin.

Preferably, but not necessarily, the groove may take a semi-circular shape or a V shape.

Preferably, but not necessarily, the camera module may further comprise a cover can that forms an exterior look of the camera module.

Preferably, but not necessarily, the groove may be formed with at least two grooves.

In another general aspect of the present invention, there is provided a camera module, the camera module comprising:

a PCB (Printed Circuit Board) mounted with an image sensor;

a lens unit disposed at a position corresponding to that of the image sensor; and a base fixing the lens unit, and coupled to the PCB, wherein a groove is formed at a peripheral surface of the lens unit.

Preferably, but not necessarily, the lens unit may further include at an upper side a flange unit so formed as to protrude to outside.

Preferably, but not necessarily, the groove may be formed at a bottom side of the flange unit.

Preferably, but not necessarily, the base may further include an actuator configured to adjust a focus of an image.

Preferably, but not necessarily, the base may include an upper end unit configured to have a minor diameter same as or greater than an outer diameter of the flange unit, a taper unit formed by being extended from a bottom side of the upper end unit and formed by being slanted to an optical axis direction, and a bottom end unit formed by being extended from a bottom side of the taper unit and having a minor diameter same as or greater than an outer diameter of the lens unit.

Preferably, but not necessarily, the groove may be formed at a peripheral surface of the lens unit positioned at a bottom end unit of the base.

Preferably, but not necessarily, the groove may be formed at a peripheral surface of the lens unit positioned at the taper unit of the base.

Preferably, but not necessarily, the groove may take a semi-circular shape or a V shape.

Preferably, but not necessarily, the camera module may further comprise a cover can that forms an exterior look of the camera module.

Preferably, but not necessarily, the groove may be formed with at least two grooves.

Advantageous Effects

The teachings in accordance with the exemplary embodiments of this present invention have an advantageous effect in that reliability of a camera module including a screw thread-freely coupled lens barrel can be improved, and the camera module can be improved in productivity and reliability by removing generation of electrical interference that may have an influence on an OIS (Optical Image Stabilization) type camera module using a single multi tape that simultaneously satisfies insulation and conductivity as well.

BRIEF DESCRIPTION OF THE DRAWINGS

FIGS. 6(a) and (b) are schematic use status views illustrating a single multi tape according to another exemplary embodiment of the present invention.

BEST MODE

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, these exemplary embodiments are provided so that this description will be thorough and complete, and will fully convey the scope of the present inventive concept to those skilled in the art.

Particular terms may be defined to describe the disclosure in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification.

The description of the various embodiments is to be construed as exemplary only for illustrative purposes, and does not describe every possible instance of the disclosure. Therefore, it should be understood that various changes may be made and equivalents may be substituted for elements of the disclosure. It will be understood that same reference numerals are used throughout the different drawings to designate the same components.

Now, the camera module according to exemplary embodiments of the present invention will be described in detail with reference to the accompanying drawings.

Figure 1:
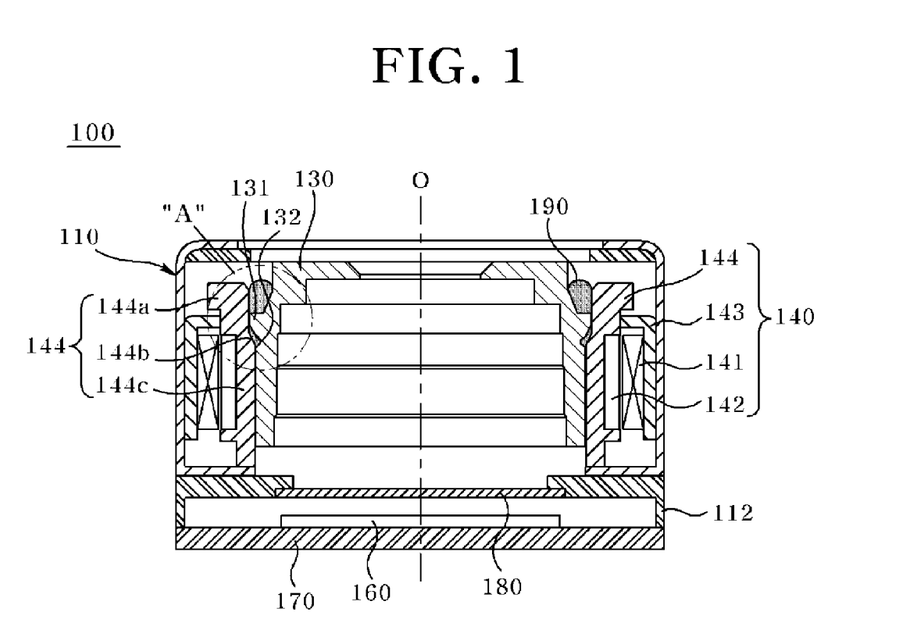
FIG. 1 is a lateral cross-sectional view illustrating a camera module mounted with screw thread-freely-coupled lens unit and bobbin according to an exemplary embodiment of the present invention.
Figure 2A:
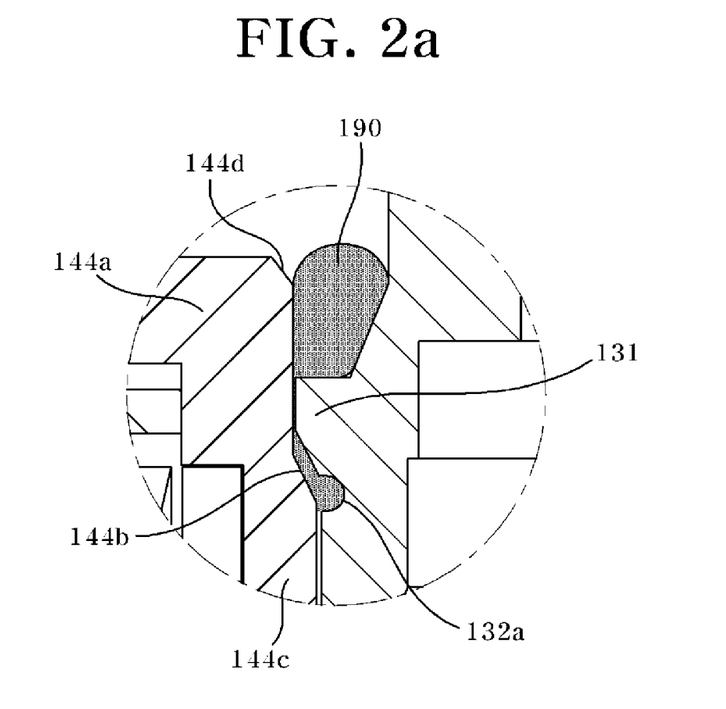
FIG. 2a is an enlarged view of "A" part according to an exemplary embodiment of the present invention illustrated in FIG. 1.
Figure 2B:
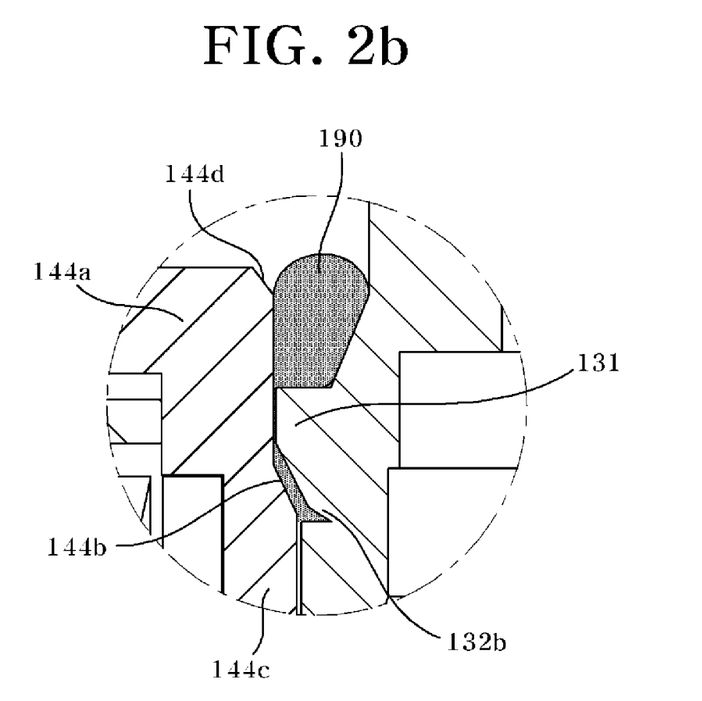
FIG. 2b is an enlarged view of "A" part according to another exemplary embodiment of the present invention illustrated in FIG. 1.

FIG. 1 is a lateral cross-sectional view illustrating a camera module mounted with screw thread-freely-coupled lens unit and bobbin according to an exemplary embodiment of the present invention, FIG. 2a is an enlarged view of "A" part according to an exemplary embodiment of the present invention illustrated in FIG. 1, and FIG. 2b is an enlarged view of "A part according to another exemplary embodiment of the present invention illustrated in FIG. 1.

Referring to FIG. 1, a camera module (100) may largely include a lens unit (130), an actuator (140), an image sensor (160) and a PCB (Printed Circuit Board, 170). Furthermore, in the exemplary embodiment, the camera module may further include a cover can (110) accommodating the lens unit (130) and the actuator (140) and forming an external look of the camera module (100). It should be apparent that the cover can (110) can be variable in outer look in response to accommodation environment inside the camera. The PCB (170) may be mounted at a bottom surface of the actuator (140). The PCB (170) may be mounted with various elements for driving the camera module (100), and apply an electric power to the actuator (140) in order to drive the actuator (140). The image sensor (160) may be mounted on the PCB (170) in order to be positioned along at least one lens accommodated into the lens unit (130) and an optical axis (0) direction. The image sensor (160) can convert an optical signal of an object incident through the lens to an electrical signal.

The lens unit (130) may be a lens barrel but the present invention is not limited thereto, and any holder structure capable of supporting the lens may be included into the lens barrel concept. The given exemplary embodiment explained an example where the lens unit is a lens barrel. The lens unit (130) may be accommodated into the cover can (110) and may be arranged at a position corresponding to that of the image sensor (160). The lens unit (130) may accommodate one or more lenses (not shown).

The actuator (140) may fix the lens unit (130) so as to be positioned inside the lens unit (130), and adjust a focus of an image by moving the lens unit (130). To be more specific, the actuator (140) may include a bobbin (144) coupled to a peripheral surface of the lens unit (130) to fix the lens unit (130), a coil unit (142) mounted at a peripheral surface of the bobbin (144), a magnet unit (141) mounted at a position corresponding to that of the coil unit (142), and a yoke unit (143) configured to fix the magnet unit (141).

Furthermore, as discussed above, the camera module may further include a separate cover can (110) configured to accommodate the actuator (140), and in this case, both of the lens unit (130) and the actuator (140) may be positioned inside the cover can (110). Under this state, a current may be applied to the coil unit (1431) as a driving signal applied to the PCB (170), and the bobbin (144) fixed by the lens unit (130) may vertically and horizontally move along the optical axis direction (0) by the magnet unit (141) interacting with the coil unit (141).

The actuator (140) may be an AF (Auto Focusing) actuator applied with a VCM (Voice Coil Motor), but the present invention is not limited thereto, and unlike what is shown in the drawing, an OIS (Optical Image Stabilization) type may be applied or an actuator-less fixed focusing type may be applied to a camera module. In case of fixed focusing type camera module, the exemplary embodiment may be formed by mounting a lens holder unit configured to accommodate the lens unit (130) instead of the actuator (140). That is, a combined structure of an inner surface of the lens holder unit being coupled to the lens unit (130) may form the exemplary embodiment.

Meantime, an IR (Infrared filter, 180) may be interposed between the image sensor (160) and the lens unit (130). The IR filter (180) may be an infrared ray filter, and may be formed with film material or glass material, and may be arranged with a plate-shaped optical filter such as image pickup cover glass and cover glass coated with IR blocking coating material.

In order to position this IR filter (180), the camera module (100) may be formed with a base (112) between the actuator (140) and the PCB (170). The IR filter (180) may be mounted at a hollow hole formed at a center of the base (112), where the base (112) is a part forming the actuator (140) and may be integrally formed with the actuator (140). Alternatively, the base (112) may be a base functioning as a sensor holder protecting the image sensor (160) apart from the actuator. Furthermore, the IR filter (180) may be arranged at the sensor holder or the actuator (140) and may be positioned at an upper surface of the sensor.

Meantime, as discussed above, the exemplary embodiment may be applied with an F.F (Fixed Focusing) type camera module, and in this case, the actuator (140) for moving the lens unit (130) is not needed, a cylindrical fixation unit may be formed at an upper side of the base (112) in order to fix the lens unit (130). That is, the base (112) may be formed at the upper side with the cylindrical fixation unit like the illustrated bobbin (144). Here, in the exemplary embodiment of the present invention, the lens unit (130) and the bobbin (144) are coupled free from screw thread. This is because, concomitant with the trend of requiring a high performance camera module, a coupling method free from screw thread may be more efficient than the screw thread coupling method.

The screw thread-free coupling method is configured such that the lens unit (130) is inserted from an upper side or a bottom side into a hollow hole of the bobbin (144) to fix the lens unit (130) to the bobbin (144). That is, an adhesive material (190) is coated at a contact area between the bobbin (144) and the lens unit (130) to fix the bobbin (144) and the lens unit (130).

The adhesive material (190) may be realized by thermosetting epoxy or UV epoxy, and may be cured by heat or exposure to UV. However, when the thermosetting epoxy is used, the bobbin (144) and the lens unit (130) are moved to an oven to allow being directly applied with heat for curing, and the adhesive material (190) is applied with UV for curing, when the UV epoxy is used. Furthermore, the adhesive material (190) may be epoxy that can be mixedly used by thermosetting epoxy and UV epoxy so that both the thermosetting and the UV curing are enabled, and one of the thermosetting and the UV curing may be selected for curing. The adhesive material (190) is not limited the above epoxy and any material that can attach the bobbin (144) and the lens unit (130) may be replacedly used.

Furthermore, the adhesive material (190) may be coated on an entire contact area between the bobbin (144) and the lens unit (130) in a ring-shape manner, and may be coated in a dotted manner or a line-connected manner at a predetermined space. The adhesive material (190) thus coated may be cured to fix the bobbin (144) and the lens unit (130). When the lens unit (130) is accommodated into the hollow hole of the bobbin (144), a fine gap may exist between a peripheral surface of the lens unit (130) and an inner surface of the bobbin (144). Under this structure, the coated adhesive material (190) may move into the gap to be transferred to an image area, that is, IR filter (180) and the image sensor (160) mounted on the base (112) along the gap between the bobbin (144) and the lens unit (130), whereby defects caused by foreign objects can be resulted to decrease the function of the camera module (100).

Thus, the lens unit (130) of the camera module (100) according to the exemplary embodiment of the present invention may include a groove (132) in order to prevent the adhesive material (190) from moving. In short, the groove (132) may be formed at a peripheral surface of the lens unit (130). The groove (132) may be formed in a recess shape to trap the adhesive material (190). The groove (132) can prevent the defects of the camera module (100) caused by penetration of adhesive material (190) by trapping the adhesive material (190) in the groove (132), using viscosity of the adhesive material (190) that may move by fine penetration. That is, the adhesive material (190) that penetrates by moving to the gap using viscosity of the UV epoxy and flow characteristic may stop at the groove, and be prevented from intrusion into the image area by being naturally cured.

Thus, although the drawing shows one groove (132), the number of grooves (132) according to the exemplary embodiment may be more than one. Furthermore, the adhesive material (190) may be coated on an entire contact area between the bobbin (144) and the lens unit (130) in a ring shape, or in a dotted manner or a line-connected manner at a predetermined space, against which the groove (132) may be also coated on a part of the peripheral surface of the lens unit (130) in a ring shape, or in a line-connected manner at a predetermined space. Meantime, the lens unit (130) may further include at an upper surface a flange unit (131) protrusively formed outwardly or from an upper peripheral surface of the lens unit (130).

The flange unit (131) may provide a space configured to receive the adhesive material (190) by being formed at the lens unit (130). Furthermore, the obtainment of accommodation space can have an effect of preventing the adhesive material (190) from entering an inner area of the gap and also facilitate an optical axis alignment of the bobbin (144) and the lens unit (130). Furthermore, the lens unit (130) may be further formed upwardly to a direction perpendicular to the optical axis (0) with a taper unit (144b, described later), which may facilitate the curing of the adhesive material (190).

Furthermore, the lens unit (130) may not be formed with the flange unit (131) protrusively formed from the peripheral surface, and the peripheral surface of the lens unit (130) may be formed in a cylindrical shape, and in this case, a partial area at the upper surface of the lens unit (130) may be escaped to obtain a space configured to accommodate the adhesive material (190), whereby a staircase sill may be formed at the upper surface of the lens unit (130).

Likewise, a partial area of the peripheral surface of the lens unit (130) may be also formed with a groove (132). The groove (132) may trap the adhesive material. Furthermore, the groove (132) may be further formed upwardly of the staircase at a direction perpendicular to the optical axis (0) with the taper unit (144b), which may facilitate the curing of the adhesive material (190).

Meantime, the bobbin (144) may include an upper end unit (144a) forming an upper end at a position corresponding to that of the lens unit (130), and having an outer diameter equal to or greater than that of the flange unit (131) of the lens unit (130), a taper unit (144b) extensively formed at a bottom surface of the upper end unit (144a) and inclined to a direction perpendicular to the optical axis (0), and a bottom end unit (144c) extensively formed at the taper unit (144b) to have a minor diameter equal to or greater than the outer diameter of the lens unit (130). Furthermore, the bobbin (144) may have a minor diameter configured to accommodate the lens unit (130) free from the taper unit (144b) and may be formed in a cylindrical shape. When the bobbin (144) is formed with the taper unit (144b), and when the adhesive material is introduced into the gap, the adhesive material may be induced into the groove, or may be naturally cured using the viscosity of the adhesive material to effectively prevent the adhesive material from being introduced into the image area. Furthermore, a corner of the upper end unit at the bobbin (144) may be further formed with an inclination unit (144d), which may facilitate the curing of the adhesive material (190).

In this structure, the lens unit (130) may be introduced into the upper end unit of the bobbin (144) and moved downwardly to be finally accommodated into the bottom end unit (144c). The downward movement of the lens unit (130) may be restricted by the flange unit (131) of the lens unit (130) being hitched by the taper unit (144b) of the bobbin (144). That is, the taper unit (144b) of the bobbin (144) and the flange unit (131) of the lens unit (130) function to restrict the downward movement when the lens unit (130) is assembled to the bobbin (144), and to limit the introduction of adhesive material thereinto. Furthermore, when there is no taper unit (144b) on the bobbin (144), the lens unit (130) may be directly cured by positioning the lens unit (130) to a fixed position of the bobbin (144), at which time the flange unit (131) may have no stopper to be hitched by.

Furthermore, although the drawing has illustrated that the groove (132) is formed at the peripheral surface of the lens unit (130) at a position corresponding to that of the taper unit (144b) of the bobbin (144), the groove (132) may be formed at the peripheral surface of the lens unit (130) by being positioned at the bottom end unit (114c) of the bobbin (144).

Referring to FIG. 2a, a shape of a cut-out surface of the groove (132a) according to an exemplary embodiment of the present invention may take a semi-circle shape in order to facilitate the manufacturing. Due to the shape of the groove (132a), the adhesive material (190) coated on the upper side of the flange unit (131) may penetrate and induce into the bottom side along a contact surface between the bobbin (144) and the lens unit (130), and further induced into an inside of the groove (132a) to thereby restrict the movement of the adhesive material (190).

Referring to FIG. 2b, a shape of a cut-out surface of the groove (132a) according to an exemplary embodiment of the present invention may take a V-shaped groove. Although the drawing has illustrated that one surface is vertically cut at the peripheral surface of the lens unit (130) and the other surface is illustrated as having an inclined V-shaped groove, the groove (132a) may have an inclined V-shaped groove at both sides. Due to the shape of the groove (132a), the adhesive material (190) coated on the upper side of the flange unit (131) may penetrate and induce into the bottom side along a contact surface between the bobbin (144) and the lens unit (130), and further induced into an inside of the groove (132a) to thereby restrict the movement of the adhesive material (190).

Furthermore, the groove (132a) of the lens unit (130) may be positioned at any place of the peripheral surface of the lens unit (130), and the groove is formed at the peripheral surface of the lens unit (130) in the present exemplary embodiment.

In short, the present invention can improve the reliability of camera module by preventing the adhesive material from transferring to an image area, i.e., the IR filter (180), the image sensor (160) and the like mounted on the base (112) by restricting movement of adhesive material in the groove (132).

Furthermore, as discussed above, the base (112) may be formed at an upper side with a cylindrical fixation unit (not shown) to fix the lens unit (130). In this case, the cylindrical fixation unit may replace the bobbin (144), and may be formed with the upper end unit (114a), the taper unit (144b), the bottom end unit (144c) and the inclination unit (144d) mounted on the bobbin (144). That is, the characteristic of the base (112) may be formed by the structural characteristic of the upper end unit (114a), the taper unit (144b), the bottom end unit (144c) and the inclination unit (144d) mounted on the bobbin (144).

Thus, the camera module according to the exemplary embodiment may include a PCB (Printed Circuit Board) mounted with an image sensor, a lens unit mounted at an upper side of the PCB to be arranged at a position corresponding to that of the image sensor, and an actuator unit configured to fix the lens unit and to adjust a focus of an image, wherein the lens unit is formed at a peripheral surface with a groove. The groove may be formed at a peripheral surface of the lens unit, and the lens unit may further include at an upper side a flange unit, and in this case, the groove may be a recess formed at a bottom side of the flange unit.

Figure 3:
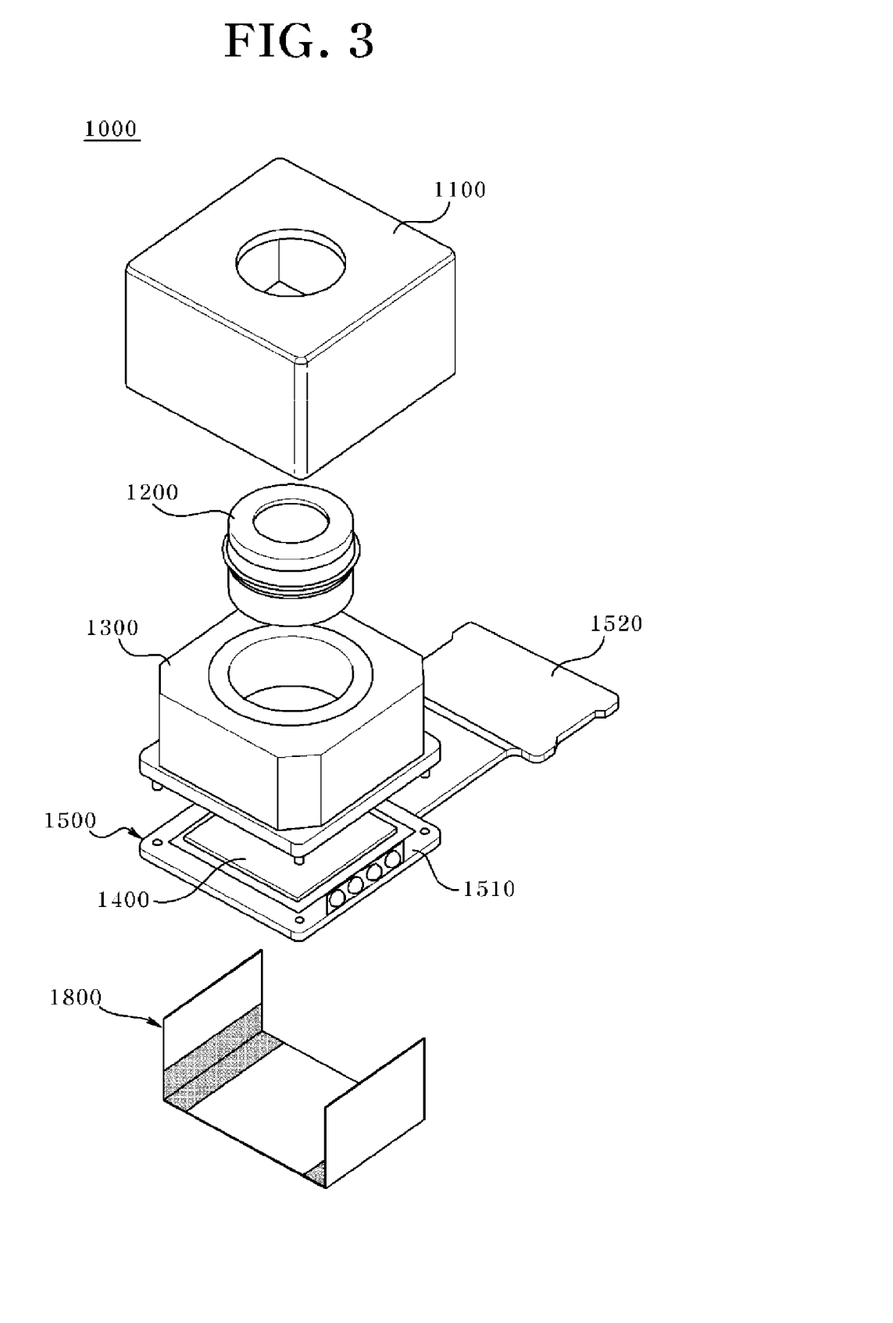
FIG. 3 is an exploded perspective view illustrating a camera module according to another exemplary embodiment of the present invention.
Figure 4:
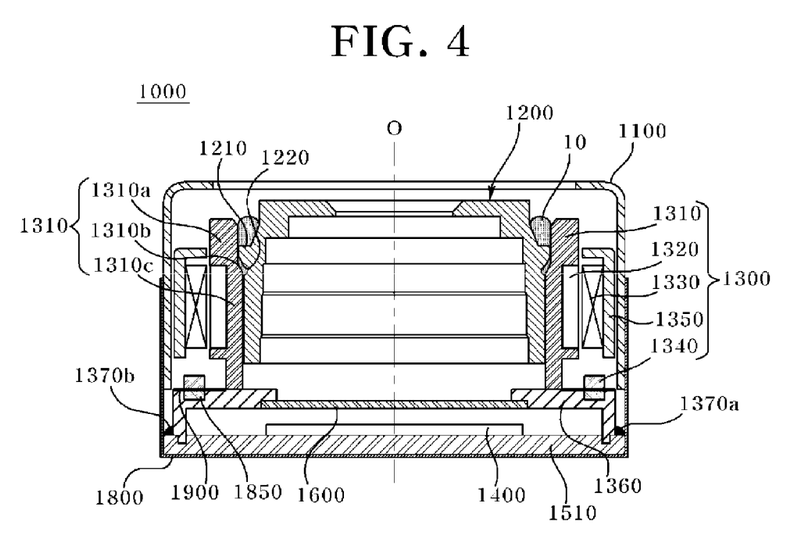
FIG. 4 is a lateral cross-sectional view illustrating a camera module according to another exemplary embodiment of the present invention.
Figure 5:
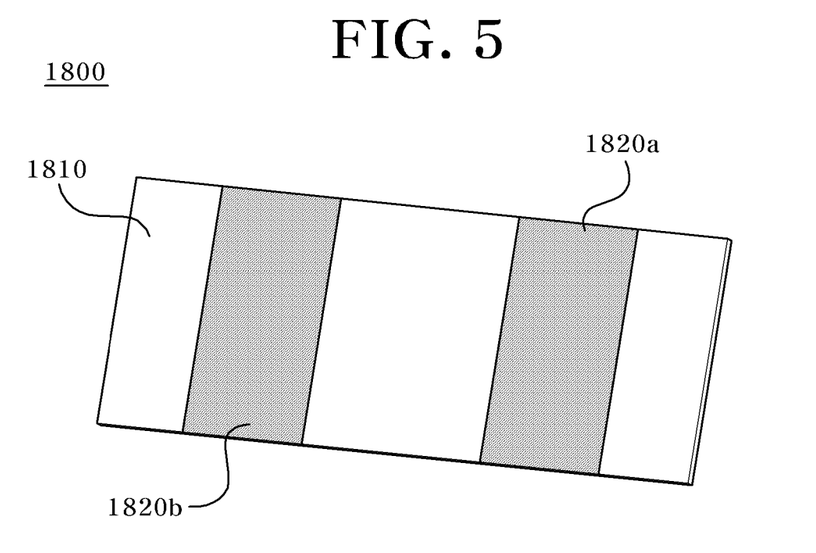
FIG. 5 is a schematic view illustrating a single multi tape according to another exemplary embodiment of the present invention.

FIG. 3 is an exploded perspective view illustrating a camera module according to another exemplary embodiment of the present invention, FIG. 4 is a lateral cross-sectional view illustrating a camera module according to another exemplary embodiment of the present invention, and FIG. 5 is a schematic view illustrating a single multi tape according to another exemplary embodiment of the present invention.

Referring to FIGS. 3 and 4, the camera module (1000) may largely include a shield can (1100), a lens unit (1200), an actuator (1300), an image sensor (1400), a PCB (1500) and a single multi tape (1800).

The shield can (1100) may accommodate the lens unit (1200) and the actuator (1300) to form an exterior look of the camera module. The shield can (1100) functions to protect internal constitutional elements against external shocks and simultaneously prevent outside foreign objects from penetrating by accommodating the lens unit (1200) and the actuator (1300) (described later). Furthermore, the shield can (1100) also functions to protect the constitutional elements of the camera module (1000) against external electronic interference generated by the mobile phone and the like. Thus, the shield can (1100) is preferably formed with a metal material.

Although the shield can (1100) is illustrated as having a cube shape formed with a projection hole opened at bottom side and configured at an upper side to receive a light, the shape of the shield can (1100) may be changed in response to structural modification inside the camera.

The PCB (1200) may include a main substrate (1510) positioned at an upper side with the shield can (1100), the lens unit (1200) and the actuator (1300), and a sub-substrate (1520) mounted with a connector (1530, see FIG. 6) configured to electrically connect the main board (not shown) by being extensively formed at one side of the main substrate (1510). Furthermore, the PCB (1500) may be formed with a circuit area formed with a circuit pattern configured to be electrically connected to a semiconductor device such as the image sensor (1400) and other circuit elements and an exposure area (PSR Open Area) in which a copper foil plated by wrapping the circuit area is exposed without PSR (Photo Solder Resist).

The image sensor (1400) may be mounted at the PCB, to be more specific, at an upper central surface of the main area (1510), in order to be positioned with at least one lens accommodated in the lens unit (1200) along the optical axis direction (0). The image sensor (1400) may convert an optical signal of an object incident through the lens to an electrical signal.

The lens unit (1200) may be a lens barrel. However, the present invention is not limited thereto, and the lens unit may include any holder structure capable of supporting the lens. The exemplary embodiment has explained an example in which the lens unit is a lens barrel. The lens unit (1200) may be mounted at an upper side of the PCB (1500), and arranged at a position corresponding to that of the image sensor (1400). The lens unit (1200) may accommodate one or more lenses (not shown).

Meantime, an IR filter (1600) may be interposed between the image sensor (1400) and the lens unit (1200), and the IR filter (1600) may be equipped with an IR ray filter. Furthermore, the IR filter (1600) and may be formed with film material or glass material, and may be arranged with a plate-shaped optical filter such as image pickup cover glass and cover glass coated with IR blocking coating material.

In order to function as a sensor holder to protect the image sensor (1400) and to simultaneously position this IR filter (1600), the camera module (1000) may be formed with a base (1360) between the actuator (1300) and the PCB (1500). In this case, the IR filter (1600) may be mounted at a hollow hole formed at a center of the base (1360), where the base (1360) is a part forming the actuator (1300) and may be formed integrally with or separately from the actuator (1300).

The actuator (1300) functions to fix the lens unit (1200) so as to be positioned inside the lens unit (1200), and adjusts a focus of an image by moving the lens unit (1200). To be more specific, the actuator (1300) may include a bobbin (1310) coupled to a peripheral surface of the lens unit (1200) to fix the lens unit (1200), a first coil unit (1320) mounted at a peripheral surface of the bobbin (1310), a magnet unit (1330) mounted at a position corresponding to the peripheral surface of the first coil unit (1320), a second coil unit (1340) mounted at a position corresponding to a bottom side of the magnet unit (1330), and a yoke unit (1350) configured to fix the magnet unit (1330).

The first coil unit (1320) may vertically move the lens unit (1200) to an optical axis direction (0), and the second coil unit (1340) may move the lens unit (1200) to a direction perpendicular to an optical axis direction (0). That is, the first and second coil units (1320, 1340) are respectively provided to supply power for adjusting an image focus of the lens unit (1200) and the actuator (1300) may include terminal units (1370a, 1370b) electrically soldered to the PCB (1500). Under this circumstances, the first coil unit (1320) or the second coil unit (1340) is individually applied with a current as a driving signal applied by the PCB (1500), and the bobbin (1310) fixed with the lens unit (1200) by the magnet unit (1330) interacting with the first coil unit (1320) or the second coil unit (1340) can move to all (left, right, up and down) directions. The actuator (1300) is applied with an OIS type exemplary embodiment unlike the AF type actuator applied with the conventional VCM.

At this time, the terminal units (1370a, 1370b) may include a first terminal unit (1370a) configured to receive a power from the PCB (1500) in order to move the lens unit (1200) to an optical axis direction (0), and a second terminal unit (1370b) mounted at a surface opposite to the first terminal unit (1370a) in order to be supplied with a power from the PCB (1500) for moving the lens unit (1200) to a direction perpendicular to the optical axis direction (0).

In short, the first terminal unit (1370a) supplies a power to the first coil unit (1320), and the second terminal unit (1370b) supplies a power to the second coil unit (1340). The first and second terminal units (1370a, 1370b) may be formed opposite to the actuator (1300) in order to facilitate the attachment of a single multi tape (1800, described later) and to minimize mutual electrical interference.

At this time, the first coil unit (1320) may receive a power from the PCB (1500), and the second coil unit (1340) may receive a power by an FPCB (1900) by being mounted at the FPCB (1900) mounted at an upper surface of the base (1360).

Meantime, in consideration of miniaturization of camera module, to be more specific, reducing a height to z axis direction which is an optical axis direction, the second coil unit (1340) may be formed in a patterned coil. Meantime, the camera module according to the present invention may further include a Hall sensor unit (1850) mounted at the FPCB (1900) in order to detect the movement of magnet unit (1330). The Hall sensor unit (1850) is provided to sense an applied voltage and intensity and phase of a current flowing in a coil and to accurately control the actuator (1300) through interaction with the FPCB (1900). Furthermore, the Hall sensor unit (1850) is provided on a straight line with the magnet unit (1330) to detect displacement on x and y axes. The Hall sensor unit (1850) may be formed nearer to the second coil unit (1340) than the magnet unit (1330), but the influence of the second coil unit (1340) is not the subject of consideration in detection of movement of the magnet unit (1330) in consideration of the fact that the intensity of magnetic field formed by the magnet is greater by hundreds than that of the electromagnetic field formed by the coil.

The terminal units (1370*a*, 1370*b*) in the camera module according to an exemplary embodiment of the present invention including the configuration thus discussed may be electrically coupled by being soldered with the PCB (1500). In this case, the terminal units (1370*a*, 1370*b*) may be no choice by being soldered at a border area of the PCB (1500). This is because the PCB (1500) is centrally mounted with the image sensor (1400) in order to be positioned on a same line with the lens unit to the optical axis direction. Thus, a soldering unit generated when the terminal units (1370*a*, 1370*b*) and the PCB (1500) are soldered may be protrusively positioned at a border area of the PCB (1500) to generate a short-circuit by being contacted to the metal-materialed cover can (1100) or to other electrical elements in a mobile phone mounted with the camera module (1000).

Furthermore, although the cover can (1100) may function to protect the internal elements from the outside shocks by accommodating the lens unit (1200) and the actuator (1300) as discussed above, the cover can (1100) must perform the function of protecting constitutional elements of camera module (1000) from outside electronic interference generated by the mobile phone. Thus, the cover can (1100) is preferably grounded.

Thus, in order to realize, in one manufacturing process, the prevention of short-circuit generation of the terminal units (1370*a*, 1370*b*) and prevention of static electricity on the cover can (1100), the exemplary embodiment of the present invention may include a single multi tape (1800).

The single multi tape (1800) may be attached to a surface opposite to the shield can (1100) and to a bottom side surface of the PCB (1500) in order to electrically conduct the shield can (1100) and the PCB (1500) and to insulate the soldered terminal units (1370*a*, 1370*b*).

To be more specific, as illustrated in FIG. 3, the single multi tape (1800) may include a conductive tape area (1810) having a length to be attached the opposite surface of the shield can (1100) and the bottom side surface of the PCB (1500), and two insulation tape areas (1820*a*, 1820*b*) each mounted on one side of the conductive tape area (1810) at a predetermined space and attached to the terminal units (1370*a*, 1370*b*).

In short, the conductive tape area (1810) of single multi tape (1800) according to an exemplary embodiment of the present invention may electrically connect the opposite surface at both sides of the cover can (1100) to an exposed area formed at the bottom side surface of the PCB (1500), and the insulation tape areas (1820*a*, 1820*b*) are attached to the terminal units (1370*a*, 1370*b*) to prevent the terminal units (1370*a*, 1370*b*) from being contacted to the outside.

Figure 6:
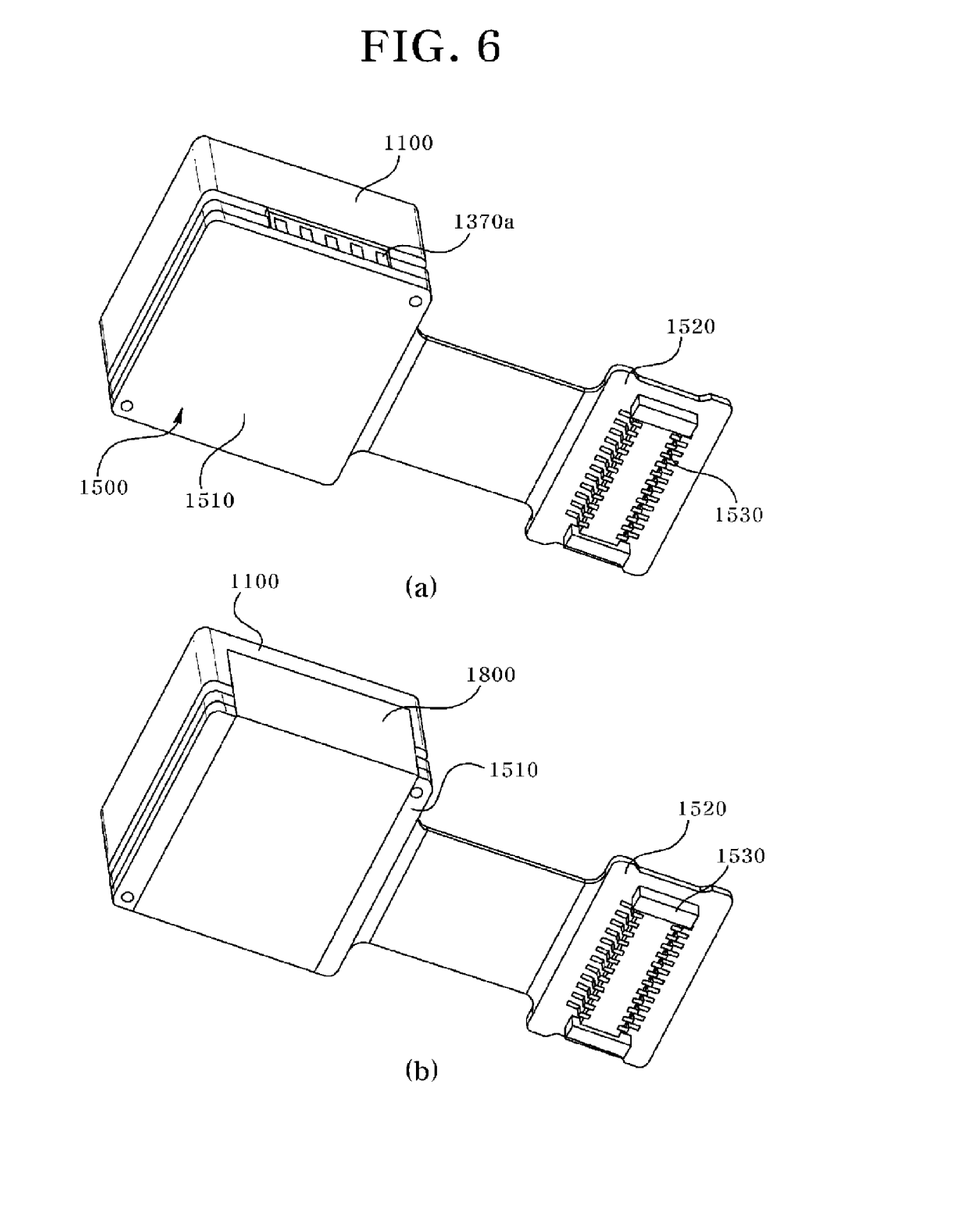

FIG. 6 is a schematic use status view illustrating a single multi tape according to another exemplary embodiment of the present invention, where (a) state illustrates a state of the camera module (1000) being assembled, where grounding of the camera module (1000) and insulation of the terminal units (1370*a*, 1370*b*) are performed, and (b) state illustrates a state of the single multi tape (1800) being attached according to exemplary embodiment of the present invention. The first terminal unit (1370*a*) shown in (a) state and non-illustrated opposite side second terminal unit (1370*b*) are bended and attached at insulation tape areas (1820*a*, 1820*b*) to a bottom lateral surface of the PCB (1500) and a bottom end surface of the shield can (1100) to thereby prevent short-circuit of the terminal units (1370*a*, 1370*b*). Furthermore, the conductive tape area (1810) is attached to an exposed area formed at a middle end area opposite to the shield can (1100) and the bottom lateral surface of the PCB (1500) to be grounded by being mutually electrically connected.

The single multi tape (1800) according to an exemplary embodiment of the present invention can simultaneously realize the ground process and the insulation process with a single attaching process to thereby shorten the manufacturing process, and the single multi tape (1800) according to an exemplary embodiment of the present invention can advantageously improve the reliability because of having a large surface.

Meantime, the lens unit (1200) and the bobbin (1310) according to an exemplary embodiment of the present invention are screw thread-freely coupled. This is because, concomitant with the trend requiring high performance camera modules, a screw thread-free coupling method may be more efficient than a screw thread coupling method, because an error scope of optical axis alignment is very strictly required.

Referring to FIG. 4 again, the screw thread-free coupling method is configured in a manner such that the lens unit (1200) is inserted to a hollow hole unit of the bobbin (1310) from an upper side or a bottom side to allow the lens unit (1200) to be fixed to the bobbin (1310). That is, the screw thread-free coupling method is such that an adhesive material (10) is coated at a contact area between the bobbin (1310) and the lens unit (1200) to securely fix the bobbin (1310) and the lens unit (1200).

The adhesive material (10) may be realized by thermosetting epoxy or UV epoxy, and may be cured by heat or exposure to UV. However, when the thermosetting epoxy is used, the bobbin (1310) and the lens unit (1200) are moved to an oven to allow being directly applied with heat for curing, and the adhesive material (10) is applied with UV for curing, when the UV epoxy is used. Furthermore, the adhesive material (10) may be epoxy that can be mixedly used by thermosetting epoxy and UV epoxy so that both the thermosetting and the UV curing are enabled, and one of the thermosetting and the UV curing may be selected for curing. The adhesive material is not limited the above epoxy and any material that can be attachable may substitute the adhesive material.

Furthermore, the adhesive material (10) may be coated on an entire contact area between the bobbin (1310) and the lens unit (1200) in a ring-shape manner, and may be coated in a dotted manner or a line-connected manner at a predetermined space. The adhesive material (10) thus coated may be cured to fix the bobbin (1310) and the lens unit (1200). When the lens unit (1200) is accommodated into the hollow hole of the bobbin (1310), a fine gap may exist between a peripheral surface of the lens unit (1200) and an inner surface of the bobbin (1310). Under this structure, the coated adhesive material (10) may move into the gap to be transferred to an image area, that is, to an IR filter (1600) and image sensor (1400) mounted on base (1360) along the gap between the bobbin (1310) and the lens unit (1200), whereby defects caused by foreign objects can be resulted to decrease the function of the camera module (1000).

Thus, the lens unit (1200) of the camera module (1000) according to the exemplary embodiment of the present invention may include a groove (1220) in order to prevent the adhesive material (10) from moving. In short, the groove (1220) may be formed at a peripheral surface of the lens unit (1200). The groove (1220) may be formed in a recess shape to trap the adhesive material (10). The groove (1220) can prevent the defects of the camera module (1000) caused by penetration of adhesive material (10) by trapping the adhesive material (10) in the groove (1220), using viscosity of the adhesive material (10) that may move by fine penetration. That is, the adhesive material (10) that penetrates by moving to the gap using viscosity of the UV epoxy and flow characteristic may stop at the groove, and be prevented from intrusion into the image area by being naturally cured.

Thus, although the drawing shows one groove (1220), the number of grooves (1220) according to the exemplary embodiment may be more than one. Furthermore, the adhesive material (10) may be coated on an entire contact area between the bobbin (1310) and the lens unit (1200) in a ring shape, or in a dotted manner or a line-connected manner at a predetermined space, against which the groove (1220) may be also coated on a part of the peripheral surface of the lens unit (1200) in a ring shape, or in a line-connected manner at a predetermined space.

Meantime, the lens unit (1200) may further include at an upper surface a flange unit (1210) protrusively formed outwardly or from an upper peripheral surface of the lens unit (1200). The flange unit (1210) may provide a space configured to receive the adhesive material (10) by being formed at the lens unit (1200). Furthermore, the obtainment of accommodation space can have an effect of preventing the adhesive material (10) from entering an inner area of the gap and also facilitate an optical axis (0) alignment of the bobbin (1310) and the lens unit (1200).

Furthermore, the lens unit (1200) may not be formed with the flange unit (1210) protrusively formed from the peripheral surface, and the peripheral surface of the lens unit (1200) may be formed in a cylindrical shape, and in this case, a partial area at the upper surface of the lens unit (1200) may be escaped to obtain a space configured to accommodate the adhesive material (10), whereby a staircase sill may be formed at the upper surface of the lens unit (1200).

Meantime, the bobbin (1310) may include an upper end unit (1310a) forming an upper end at a position corresponding to that of the lens unit (1200), and having an outer diameter equal to or greater than that of the flange unit (1210) of the lens unit (1200), a taper unit (1310b) extensively formed at a bottom surface of the upper end unit (1310a) and inclined to a direction perpendicular to the optical axis (0), and a bottom end unit (1310c) extensively formed at the taper unit (1310b) to have a minor diameter equal to or greater than the outer diameter of the lens unit (1200).

Furthermore, the bobbin (1310) may have a minor diameter configured to accommodate the lens unit (1200) free from the taper unit (1310b) and may be formed in a cylindrical shape. When the bobbin (1310) is formed with the taper unit (1310b), and when the adhesive material is introduced into the gap, the adhesive material may be induced into the groove, or may be naturally cured using the viscosity of the adhesive material to effectively prevent the adhesive material from being introduced into the image area. Furthermore, a corner of the upper end unit at the bobbin (1310) may be further formed with an inclination unit, which may facilitate the curing of the adhesive material (10).

In this structure, the lens unit (1200) may be introduced into the upper end unit of the bobbin (1310) and moved downwardly to be finally accommodated into the bottom end unit (1310c). The downward movement of the lens unit (1200) may be restricted by the flange unit (1210) of the lens unit (1200) being hitched by the taper unit (1310b) of the bobbin (1310). That is, the taper unit (1310b) of the bobbin (1310) and the flange unit (1210) of the lens unit (1200) function to restrict the downward movement as a stopper when the lens unit (1200) is assembled to the bobbin (1310), and to limit the introduction of adhesive material (10) thereinto. Furthermore, when there is no taper unit (1310b) on the bobbin (1310), the lens unit (1200) may be directly cured by positioning the lens unit (1200) to a fixed position of the bobbin (1310), at which time the flange unit (1210) may have no stopper to be hitched by.

Furthermore, although the drawing has illustrated that the groove (1220) is formed at the peripheral surface of the lens unit (1200) at a position corresponding to that of the taper unit (1310b) of the bobbin (1310), the groove (1220) may be formed at the peripheral surface of the lens unit (1200) by being positioned at the bottom end unit (1310c) of the bobbin (1310). The adhesive material (10) coated at an upper surface of the flange unit (1210) may penetrate and be introduced to a bottom side along a contact surface between the bobbin (1310) and the lens unit (1200) to be absorbed into the groove (1220) and restricted of further movement.

Furthermore, the position of the groove (1210) at the lens unit (1200) may be formed at any area of the peripheral surface of the lens unit (1200). The groove (1210) is formed at an upper peripheral surface of the lens unit (1200).

In short, the movement of the adhesive material (10) is restricted by disposition of the groove (1220), that is, the adhesive material is prevented from transferring to an image area such as IR filter (1600) formed at the base (1360) side and the image sensor (1400) to thereby improve the reliability of the camera module (1000).

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

The invention claimed is:
1. A camera module, the camera module comprising:
a PCB (Printed Circuit Board) mounted with an image sensor;
a lens unit installed at an upper side of the PCB, and disposed at a position corresponding to that of the image sensor;
an actuator unit comprising a bobbin including a through hole accommodating the lens unit and adjusting a focus of an image; and
a flange unit formed on a peripheral surface of the lens unit and protruded from the peripheral surface of the lens unit, wherein a coupling surface of the lens unit is formed as a cylindrical surface on the peripheral surface of the lens unit at a bottom side of the flange unit, wherein the peripheral surface of the lens unit is not formed with a screw thread, wherein an upper portion of the bobbin is coupled with the flange unit of the lens unit, wherein an inner surface of a bottom portion of the bobbin is surface-contacted with the coupling surface of the lens unit, wherein a taper unit is formed on an inner surface of the bobbin between the upper portion of the bobbin and the bottom portion of the bobbin, wherein an outer diameter of the flange unit is longer than an inner diameter of the inner surface of the bottom portion of the bobbin, wherein the flange unit and the taper unit are vertically overlapped with each other, and wherein a bottom end of the lens unit is disposed lower than a bottom end of a coil unit of the actuator unit.

2. The camera module of claim 1, wherein the flange unit is protruded to outside.

3. The camera module of claim 1, further comprising a groove formed on the peripheral surface of the lens unit between the flange unit and the coupling surface, wherein the groove is recessed from the coupling surface, wherein the upper portion of the bobbin is coupled with the flange unit of the lens unit by an adhesive material, and wherein a space is formed between the groove of the lens unit and the taper unit of the bobbin.

4. The camera module of claim 3, wherein the actuator unit further comprises the coil unit formed at a peripheral surface of the bobbin, a magnet unit formed at a position corresponding to that of the coil unit, and a yoke unit configured to fix the magnet unit.

5. The camera module of claim 4, wherein the upper portion of the bobbin is configured to form an upper end of the bobbin and to have a minor diameter same as or greater than an outer diameter of the flange unit, the taper unit is formed by being extended from a bottom side of the upper portion of the bobbin and formed by being slanted to an optical axis direction, and the bottom portion of the bobbin is formed by being extended from a bottom side of the taper unit and has a minor diameter that is the same as an outer diameter of the coupling surface of the lens unit.

6. The camera module of claim 5, wherein the groove is formed at the peripheral surface of the lens unit positioned at the bottom portion of the bobbin.

7. The camera module of claim 5, wherein the groove is formed at a peripheral surface of the lens unit positioned at the taper unit of the bobbin.

8. The camera module of claim 3, wherein the groove takes a semi-circular shape or a V shape.

9. The camera module of claim 3, wherein the groove of the lens unit is formed as at least two groove portions.

10. The camera module of claim 1, further comprising a cover can that forms an exterior look of the camera module.

11. A camera module, comprising:
a yoke unit;
a bobbin disposed inside the yoke unit;
a magnet unit disposed on the yoke unit;
a coil unit disposed on the bobbin and facing the magnet unit;
a lens coupled with an inner peripheral surface of the bobbin; and
a flange unit formed on a peripheral surface of the lens unit and protruded from the peripheral surface of the lens unit, wherein a coupling surface of the lens unit is formed as a cylindrical surface on the peripheral surface of the lens unit at a bottom side of the flange unit, wherein the peripheral surface of the lens unit is not formed with a screw thread, wherein an upper portion of the bobbin is coupled with the flange unit of the lens unit, wherein an inner surface of a bottom portion of the bobbin is surface-contacted with the coupling surface of the lens unit, wherein a taper unit is formed on an inner surface of the bobbin between the upper portion of the bobbin and the bottom portion of the bobbin, wherein an outer diameter of the flange unit is longer than an inner diameter of the inner surface of the bottom portion of the bobbin, wherein the flange unit and the taper unit are vertically overlapped with each other, and wherein a bottom end of the lens unit is disposed lower than a bottom end of a coil unit of the actuator unit.

12. The camera module of claim 11, wherein the flange unit is protruded to outside.

13. The camera module of claim 11, further comprising a groove formed on the peripheral surface between the flange unit and the coupling surface, wherein the groove is recessed from the coupling surface, wherein the upper portion of the bobbin is coupled with the flange unit of the lens unit by an adhesive material, and wherein a space is formed between the groove of the lens unit and the taper unit of bobbin.

14. The camera module of claim 13, further comprising a base disposed under the yoke unit.

15. The camera module of claim 14, wherein the upper portion of the bobbin is configured to have a minor diameter same as or greater than an outer diameter of the flange unit, the taper unit is formed by being extended from a bottom side of the upper portion of the bobbin and formed by being slanted to an optical axis direction, and the bottom portion of the bobbin is formed by being extended from a bottom side of the taper unit and has a minor diameter that is the same as an outer diameter of the coupling surface of the lens unit.

16. The camera module of claim 15, wherein the groove is formed at a peripheral surface of the lens unit positioned at the bottom portion of the base.

17. The camera module of claim 15, wherein the groove is formed at a peripheral surface of the lens unit positioned at the taper unit of the base.

18. The camera module of claim 13, wherein the groove takes a semi-circular shape or a V shape.

19. The camera module of claim 13, wherein the groove of the lens unit is formed as at least groove portions.

20. The camera module of claim 11, further comprising a cover can that forms an exterior look of the camera module.

* * * * *